Figure 1:
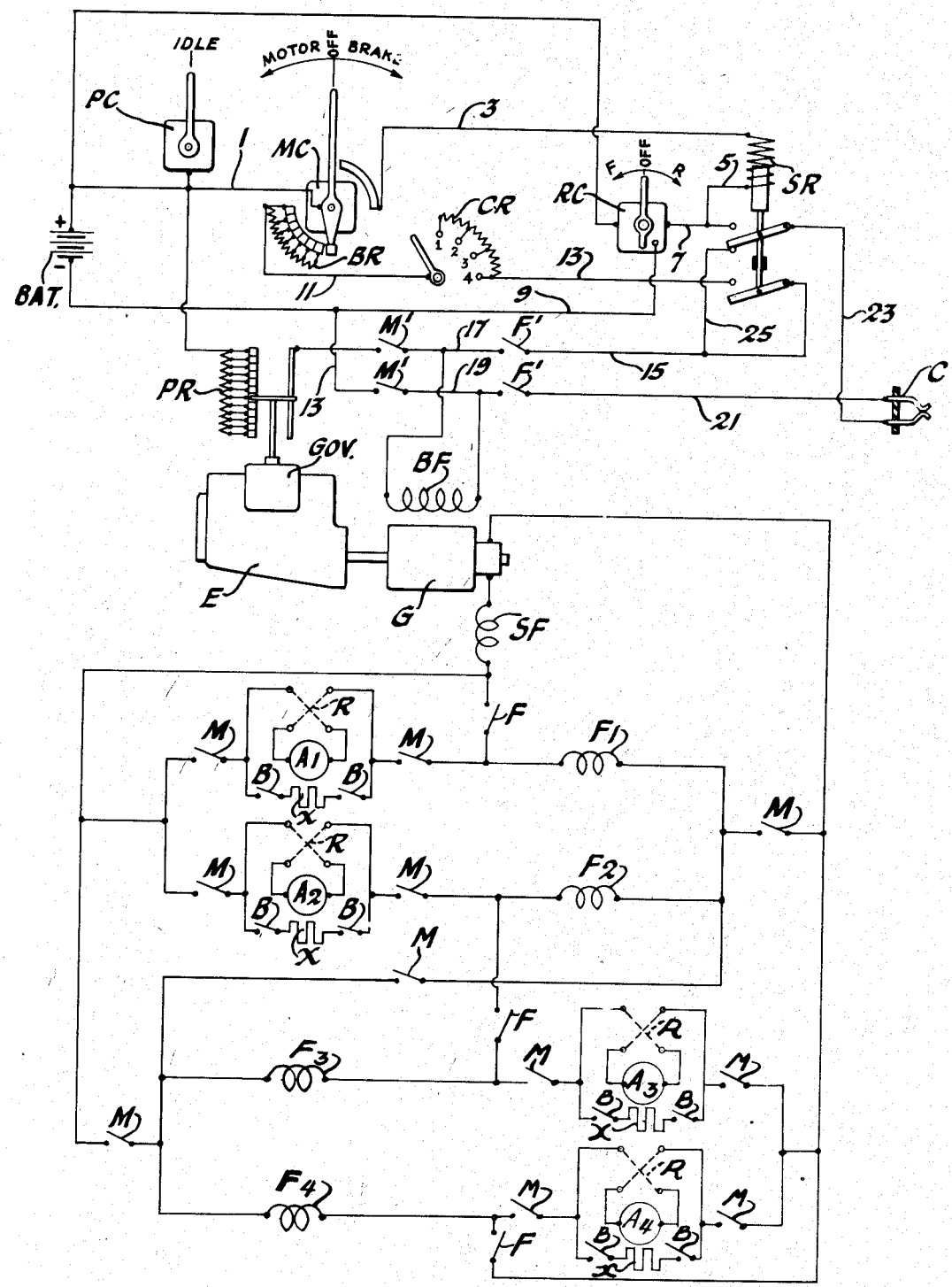

Inventors
Richard M. Dilworth,
Stuart H. Cowin &
Torsten O. Lillquist.

Dec. 15, 1942.　　　R. M. DILWORTH ET AL　　　2,304,895
DYNAMIC BRAKING AND CONTROL SYSTEM
Filed April 9, 1942　　　2 Sheets-Sheet 2

Inventors
Richard M. Dilworth,
Stuart H. Cowin &
Torsten O. Lillquist
By Blackmore, Spencer & Flint
Attorneys Patented Dec. 15, 1942

2,304,895

UNITED STATES PATENT OFFICE 2,304,895

DYNAMIC BRAKING AND CONTROL SYSTEM

Richard M. Dilworth, Hinsdale, Stuart H. Cowin, Chicago, and Torsten O. Lillquist, Clarendon Hills, Ill., assignors to General Motors Corporation, Detroit, Mich., a corporation of Delaware Application April 9, 1942, Serial No. 438,328

5 Claims. (Cl. 290—3)

The present invention relates to electric driving and braking systems for Diesel electric locomotives and more particularly relates to control means whereby a plurality of locomotives having similar dynamic braking systems may be conveniently controlled and operated as a multi-unit locomotive from the control means of one unit.

The usual practice of operating a plurality of Diesel electric locomotive units in multiple for obtaining higher operating speeds of trains hauled by these units has imposed increased demands on the conventional air brake systems provided for retarding these trains on grades. Where retardation is accomplished solely by the air brakes, rapid wear of the wheels and brake shoes takes place. In order to reduce the wheel and brake shoe wear some form of dynamic electrical braking may be used in addition to the air brakes.

Two general forms of dynamic braking are available for Diesel electric locomotives, one form being merely to provide means to reverse either the series field or armature winding of conventional series type traction motors and connect the motors across braking grids having a resistance suitable to cause stable operation of the motors as a series generator. This form of braking requires little additional control equipment but the load resistance on the series generator cannot be varied widely from a critical value at which stable operation may be obtained. This form of braking therefore provides a substantially constant retarding force suitable only for holding a given weight of train on a given grade at a given speed for a given time and therefore requires the use of the air brakes to prevent overloading of the electrical braking means where the speed or time values are exceeded.

Another form of dynamic braking is also available which requires the use of compound traction motors and elaborate control means for controlling the excitation current in certain of the field windings thereof to obtain a variable retarding force at the wheels of the locomotive connected to the motors. The added cost of the additional excitation windings on the traction motors and excitation control equipment necessary in order to obtain variable retarding force has prevented wide use of this type of dynamic braking.

The principal object of the present invention is to provide on Diesel electric locomotive units simple connecting and control means for interconnecting and controlling the excitation current of the generators and for connecting the traction motor series field windings to the generators and their armatures to braking resistors so that each of the motors acts as a separately excited generator and exerts equal retarding force.

Another object is to provide means on one locomotive unit operable by the manual control means thereof to permit control of other units and to render the manual control means of the other units inoperative when a plurality of units are interconnected.

Another object is to provide means on a locomotive unit to limit the retarding force to a preselected maximum value and also to limit the retarding force of other units interconnected therewith to the same preselected maximum value.

Another object is to provide polarized connectors on the locomotive units for supplying excitation current of proper polarity to the motor fields from the generator of each interconnected unit to obtain prompt generator braking action therefrom.

The combined means by which the above objects are attained will be better understood by reference to the schematic drawings and the following detailed description of our simple dynamic braking and control system permitting a plurality of Diesel electric locomotive units to be operated as a multi-unit locomotive or singly, as desired.

Figure 2:
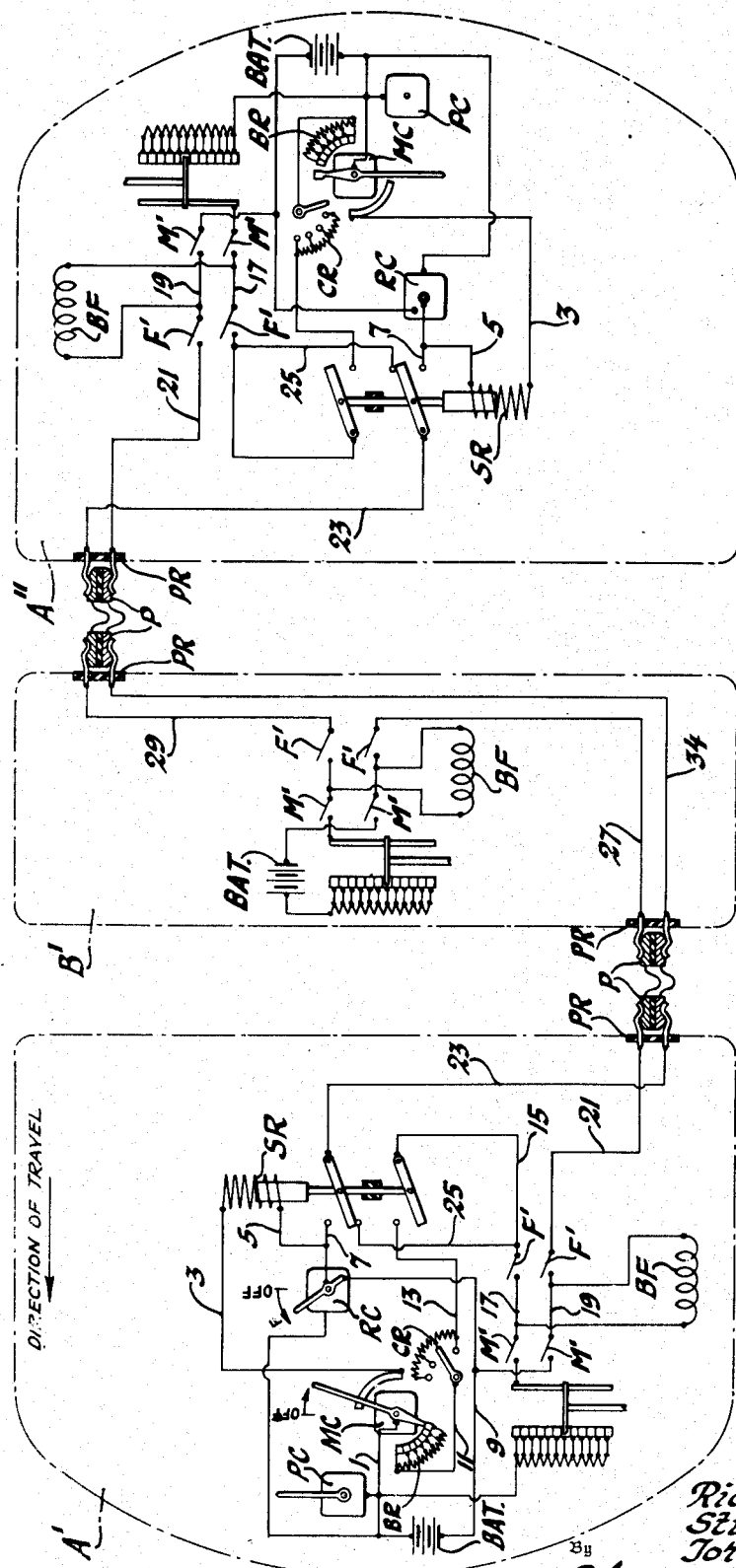

Figure 1 of the drawings show diagrammatically our dynamic braking and control system applied to a single locomotive unit; and Figure 2 shows the connecting means whereby a plurality of locomotive units having similar dynamic braking systems may readily be interconnected and controlled by the control means of one unit only.

Referring to Figure 1, the dynamic braking system shown is for a single locomotive but includes means for interconnection with other units of similar type. The single unit system shown in Figure 1 includes a Diesel engine E, an electric generator G driven thereby and a plurality of traction motors having conventional series field windings shown at F1 to F4 and armatures shown at A1 to A4 which are individually connected in any well known manner to separate wheels of the locomotive, not shown, to drive or be driven thereby.

Power connections are shown extending between the generator and motors in which there are shown switching means R, M, B and F and braking resistors X.

The switching means R is operable in conventional manner to simultaneously reverse the motor armature windings to cause reversal of the motors.

The switching means M serves as motor control means and is operable in conventional manner to connect the motors in series or parallel power receiving circuit relation with the generator G for driving the locomotive wheels.

The switching means B and F serve as motor braking control means and are shown arranged in the power connections so that upon simultaneous closure thereof the motor armatures A1 to A4 will be individually connected across separate braking resistors X by operation of the switching means B, and the series field windings F1 to F4 will be connected in series with the generator G for separate excitation thereby to cause the motors to build up and operate in a stable manner as separately excited braking generators and exert equal retarding force on the individual locomotive wheels driving the motor armatures.

The generator G is shown provided with a series field winding SF and a field winding BF included in a separate excitation circuit in which there are also included a battery BAT, switching means M' and F', a power rheostat PR, a braking rheostat BR, a variable compensating resistor CR, a selector relay SR and a polarized receptacle connector C. The connector C is located on the end of the locomotive unit and provides means for interconnecting similar generator excitation circuits of other locomotive units in a manner to be described.

The engine E is provided with a conventional speed governor shown generally at GOV for operating the power rheostat PR and for operating also the conventional engine fuel regulating means, not shown, in a well known manner whereby the engine and generator are caused to operate at constant speed, load and power output. The governor is also provided with any well known type of speed setting means to vary the governor speed response in a well known manner so that the engine and generator may be caused to operate at any one of a plurality of preselected constant values of speed, load and output. Certain values of speed, load and output are selected to supply the proper power input to the motors when the motors are connected in either series or parallel circuit relation with the generator in conventional manner, and at least one value of speed, load and output is selected to properly excite the motor series field windings when these windings are connected to the generator and the motor armatures are connected to the braking resistors X to serve as braking generators.

The above mentioned switching means and also the governor setting means may be of the conventional electrically actuated or controlled type which is capable of being controlled by a controller located remotely with respect thereto on the same locomotive unit or another unit and connected with the controller by conventional control connections, not shown, on and between the locomotive units.

As shown in Figure 1 the locomotive unit is provided with three manually operable controllers, RC, PC and MC adapted to control the governor setting means and switching means of this unit and also other units interconnected therewith through the conventional control connections mentioned, but not shown. The reversing controller RC serves to control the conventional motor reversing switching means of one or more locomotive units and the power controller PC serves to control the governor setting means of one or more units in conventional manner. The motor controller MC likewise serves in conventional manner to control simultaneously the switching means M and M' of one or more units to cause the motors to be connected in series or parallel with the generator and to cause the winding BF of the generator to be connected with the power rheostat PR and battery BAT when the controller handle is moved to the motor control positions. Movement of the handle of the controller MC to the braking control positions, however, serves to control the switching means B, F and F' of one or more locomotive units to cause the motor series field windings F1 to F4 of one or more locomotive units to be connected to the generators G of these units and the armatures A1 to A4 thereof to be connected to the braking resistors X.

As will now be explained in detail, movement of the handle of the braking controller RC to the forward position and movement of the handle of the motor controller MC to any of the braking positions causes operation of the selector relay SR which inserts the battery braking resistor BR and compensating resistor CR in series with the polarized receptacle C, generator field winding BF and switching means F' which is then closed and permits operation of the braking resistor BR by the motor controller MC. The control and interlocking connections between the above mentioned means, about to be described, also permit the interconnection of a plurality of generator field windings BF on other locomotive units so that the excitation current in one or more of these windings may be varied by operation of the motor controller MC on only one of the interconnected units in order that the excitation current in the series field windings of the traction motors connected to these generators may be varied to cause equal and variable values of retarding force to be exerted by motors on one or more interconnected units.

Referring now to Figure 1, the handle of the controller MC, as schematically shown, is connected by a conductor 1 to the positive battery terminal, and the contacts of the braking rheostat BR and a separate arcuate contact are shown located adjacent the path of movement followed by the handle when moved to the braking positions so that the handle will contact simultaneously the rheostat contacts and separate arcuate contact. The arcuate contact is connected by a conductor 3 to one winding terminal of the previously mentioned selector relay SR, the opposite winding terminal of which is shown connected by conductors 5 and 7 to a fixed interlocking contact shown on the reversing controller RC. This fixed interlocking contact is located adjacent the handle of the controller RC so that upon movement of the handle to the forward position indicated the handle is brought into electrical contact therewith. As schematically shown on the drawing the controller shaft operated by the handle is connected by a conductor 9 to the negative battery terminal.

With the handle of the controller MC in the braking position and the handle of the controller RC in the forward position, the relay winding will be energized through conductors 1, 3, 5, and 7, and the relay armature and contacts shown operably connected thereto will be attracted and moved upward by the energization of the winding into contact with upper and lower fixed relay contacts shown. The normal position of the relay armature and contacts is as shown, with the lower armature contact in contact with a fixed relay contact located between the upper and lower fixed contacts when the winding is de-energized.

With the upper and lower relay armature contacts in contact with the upper and lower fixed contacts the braking rheostat BR and variable compensating resistor CR are connected in series through the following connections with the battery BAT, generator field winding BF, polarized receptacle connector C and switching means F', which, as previously described, is closed when the controller MC is in the braking position.

One terminal of the braking rheostat BR is connected by a conductor 11 to a movable contact arm of the compensating resistor CR, the other terminal of which is connected by a conductor 13 to the lower fixed relay contact. The upper fixed relay contact is connected to the conductor 7. The polarized receptacle connector C, switching means F' and battery field winding BF are shown connected in series relation across the upper and lower relay armature contacts by conductors 15, 17, 19, 21 and 23. The central fixed relay contact is connected by a conductor 25 to the conductor 15.

The polarized receptacle connector C is provided with two spring contacts normally biased into electrical contact, as shown in Figure 1, and is also provided with a suitable opening to allow one way entrance of a double contact polarized plug P shown in Figure 2. In Figure 2 the plugs P are shown fully entered into the receptacles C to separate the spring contacts thereof and permit each to contact a separate plug contact. Like contacts of pairs of plugs P are interconnected by separate flexible conductors and by this means the receptacles on adjacent ends of separate locomotive units may be interconnected so that the generator field windings BF of the respective units may be connected in series and in proper polarity.

The variable compensating resistor CR is shown provided with four sections, each section being of the same resistance, and separate taps and interconnected fixed contacts are shown connected to each section. With the movable contact of the resistor CR on the fixed contact numbered 1, as shown in Figure 1, the total resistance of all four resistance sections is connected in series in the generator excitation circuit to limit the maximum current therein to a value suitable for exciting the series windings of the traction motors of one locomotive unit only so that equal preselected maximum values of retarding force will be exerted by the motors, acting as generators. The retarding force of each may be reduced from the maximum value by movement of the handle of the controller MC toward the off position. When the movable contact of the compensating resistor is moved successively from the fixed contact 1 to the fixed contacts 2, 3 and 4 the total resistance therein is reduced in equal steps to maintain an equal maximum value of excitation current in 1, 2, 3 or 4 similar generator excitation windings BF located on different locomotive units and interconnected in series relation with a single battery BAT on one of said units. With the same maximum value of current in one or more series connected generator excitation windings the current supplied to the series field windings of the traction motors connected to each of the generators will be equal when the generators are operated at the same speed, and therefore the same preselected maximum value of retarding force exerted by each of the motors of each unit will be maintained.

The dynamic braking means and connections described with reference to Figure 1 enable other locomotive units having similar dynamic means and connections without controllers to be interconnected therewith and controlled thereby. The locomotive units having controllers such as are shown in Figure 1 are known as A type or control units, and those not provided with controllers are known as B type or controlled units.

The conventional control connections on and between the units, not shown, for controlling the motor reversing switches thereof are interconnected to cause the same direction of travel of the trailing units in conventional manner so that the motors, for example, of the unit A" shown facing opposite to that of the unit A' will be in reverse when the control handle of the reverse controller of unit A' is in the forward position shown. If it is assumed that the units are mechanically coupled and electrically interconnected by the conventional control means described and the engine and generators are operating at equal values of speed, for example, idling speed, when the engine controller is shown in the idling position and it is desired to cause all of the traction motors to serve as braking generators, the controls are operated on the control unit A' in the following manner.

The movable contact of the compensating resistor CR is shown moved to contact and tap 3 as three units are to be operated together. The handle of the controller MC is then moved from the off position to the braking position, which causes all of the motors and all of the motor armatures A1 to A4 of each unit to be connected across resistors X and the series field windings F1 to F4 thereof to be connected across the generator G of each respective unit. With the handle of the controller MC moved to the braking position the switching means F' on each unit is in the closed position and the winding of relay SR on the unit A' will be energized and the relay contacts will close as previously described. When these relay contacts close, current will flow from the positive battery terminal of the unit A' through the braking rheostat BR, compensating resistor CR, closed lower relay contacts, closed switching means F', generator field BF to the upper contact of the plug receptacle C on the rear end of the unit A' by means of conductors 1, 11, 13, 15, 17, 19, and 21 connected therebetween.

Current will then flow between the upper contact of the polarized receptacle C on the rear end of unit A' to the upper contact of a similar receptacle on the forward end of the unit B', as these contacts are shown interconnected by one conductor of a two-wire flexible conductor connecting these like contacts of the polarized plugs P which are shown in contact with these upper receptacle contacts.

Current will then flow through the generator field winding BF on the unit B' which is connected between the upper contacts of the front and rear receptacles on the B' unit by conductors 27 and 29, as the switching means F' of the unit B' is also closed.

The current will then flow between the upper contact of the receptacle connector C on the rear of unit B' to the upper contact of the receptacle of the unit A", as these contacts are likewise shown connected by like interconnected plug contacts.

Current then flows from the upper receptacle contact of the unit A" through the contacts on the selector relay, which are normally closed as shown when the winding thereof is de-energized, and then through the closed switching means F" and generator field winding BF to the lower contact of the receptacle PR of the unit A' by means of the conductors 23, 25, 17, 19 and 21 interconnecting the above means on the unit A".

The return circuit from the lower receptacle contact on the unit A" to the negative terminal of the battery on the unit A' is through the lower interconnected contacts on the receptacles C, conductor 34 on the unit B and closed upper contacts on the relays SR of the unit A' and conductors 23, 7 and 9 on the unit A'.

It will be evident that with the power, dynamic braking, control and connecting means included on each locomotive unit described, the excitation windings of the generators on one or more locomotive units may conveniently be interconnected in series with manually operated excitation current limiting and varying means, and the battery located on one unit only and the conventional series field windings of the traction of the motors of each locomotive unit may be connected to the generator of that unit for variable separate excitation therefrom, and the armatures of the motors may be connected to braking resistors so that all of said motors on the interconnected units act as separately excited braking generators exerting equal values of retarding force which may be varied from a preselected maximum value by operation of the manual control means provided on one of said units.

The polarized receptacle connectors and plug connectors are provided for interconnecting the generator battery field windings BF in series and to keep the polarity of these windings the same with respect to the self excited generator winding SF irrespective of the end-to-end relation of connection of the A and B type units.

With the connection arrangement shown between the motors and generator, for a given direction of rotation of the motor armatures the polarity of the motor fields is kept the same whether the motors are acting as generators or motors.

It will also be evident that the dynamic braking systems of the locomotive units of the A type having controllers may be controlled and operated separately as the polarized receptacles have their contacts normally closed to maintain the generator excitation circuit closed when the polarized connector plugs are removed.

We claim:

1. In a multi-unit locomotive, each unit comprising a plurality of traction motors, each operably connected to individual locomotive wheels, an electric generator, a prime mover driving the generator at a preselected value of speed, braking connections between the generator and motors including braking resistors and switching means for connecting the motor fields to the generator and the motor armatures to the resistors, and a generator excitation circuit including a generator field winding, a polarized connector, switching means for connecting the winding and connector in said excitation circuit, a source of power, a rheostat, and a relay normally disconnecting said rheostat and source of power from said circuit but operable to connect said rheostat and source of power in series in said excitation circuit, polarized connections for interconnecting said polarized connectors to connect the generator excitation circuits of said locomotive units in series and a manually operable controller on certain of said units for controlling said switching means in the braking and generator excitation circuits of all said units and for also controlling operation of the relay and operating the rheostat of one of said said units whereby the excitation current of all said generators may be varied to control the excitation current supplied thereby to all of said motors in order to cause each to exert variable and equal values of braking force to the wheels of said locomotive units.

2. In a multi-unit locomotive, each unit comprising a plurality of of series motors individually connected to separate locomotive wheels, an electric generator, an engine driving said generator at a preselected value of speed, a braking circuit including braking resistors and switching means for connecting the series fields of the motors in series with the generator and the armatures of the motors across said resistors to cause the motors to act as braking generators, and an excitation circuit for the generator including a field winding, a polarized connector, and switching means for connecting the' connector and winding in series, certain of said units being provided with a battery, a rheostat and a relay operable to connect the battery and rheostat in series relation in said excitation circuit, and a manually operable controller for simultaneously controlling all of said switching means on all of said units and for controlling operation of one rheostat and one relay on one unit only, polarized connections for interconnecting the polarized connectors of said units to connect the generator excitation circuits in series and in proper polarity whereby operation of any controller causes the excitation current in said generator excitation circuits to be varied to cause equal variations in the series field windings of all of said motors thereby causing equal variations in braking force on the separate wheels of said locomotive units.

3. In a multi-unit locomotive, each unit comprising a plurality of series traction motors individually connected to individual locomotive wheels, an electric generator, an engine driving the generator at a constant preselected value of speed, dynamic braking connections between the motors and generator, said connections including braking resistors and switching means for connecting the motor fields in series with the generator and the armatures across the resistors, an excitation circuit for the generator including a field winding and a polarized receptacle connector and switching means operable to connect the winding and connector in series closed circuit relation, certain of said generator excitation circuits of certain units comprising excitation varying and limiting means, said means comprising a battery, a rheostat, a manually adjustable resistance in said circuit and a manually operable controller for controlling operation of said rheostat, relay and all of said switching means on all of said locomotive units, interconnected polarized plugs one-way insertable in said polarized connectors for breaking said individual generator excitation circuits and for connecting all of said circuits in series and in the same polarity so that the current in one or all of said generator excitation circuits may be limited to a given value suitable for any number of interconnected units and the current may be controlled by operation of one rheostat by any one controller to cause proportional variations in the current supplied to the motor field windings connected to the respective generators, thereby causing proportional variations in the braking force exerted by each of said motors.

4. In a multi-unit locomotive, each unit comprising a plurality of series motors individually connected to individual locomotive wheels, an electric generator, a Diesel engine driving said generator at a preselected constant value of speed, electrical connections between the motors and generator, said connections comprising braking resistors, braking switching means for connecting the motor fields in series with the generator and their armatures across the resistors to cause the motors to act as braking generators, and reversing switching means for reversing the motor fields with respect to the armatures, and an excitation circuit for the generator including a field winding, a polarized connector and excitation switching means for connecting said winding and connector in closed circuit series relation, certain of said units being provided with a battery, a braking rheostat, a relay connected to said battery, rheostat, and one of said generator excitation circuits, said relay being operable to connect the battery and rheostat in series in said circuit, a manually operable controller for controlling said braking and excitation switching means on all of said units and for operating one braking rheostat, a manually operable reversing controller for operating said reversing switching means on all of said units, and interlocking and control connections between said relay and both of said controllers on one unit to control operation of one of said relays by operation of both of said controllers, and polarized connecting means for interconnecting said polarized connectors on said units to connect said generator excitation circuits in series and in proper polarity so that upon operation of both of said controllers on any unit the excitation of all of said circuits may be varied equally to vary the excitation current in the fields of all of said motors connected to each of said generators, thereby causing equal variations in braking force on the individual wheels of all of said units.

5. In a multi-unit locomotive, each unit comprising a plurality of traction motors individually connected to separate locomotive wheels, an electric generator, an engine driving said generator, means for controlling the speed of the engine, electrical connections between the motors and generator, said connections comprising braking resistors, braking switching means for connecting the motor fields to the generator and their armatures across said resistors to cause said motors to act as braking generators, an excitation circuit for the generator including at least one polarized connector and excitation switching means for connecting the winding and polarized connector in closed circuit series relation, certain of said units having polarized connectors on each end thereof, a battery, a braking rheostat, a relay connected to said battery, said rheostat and one of said excitation circuits, said relay being operable to connect the battery and rheostat in series with said circuit, a manually operable controller for controlling one relay and rheostat and for controlling the excitation switching means on all said locomotive units, and a second master controller for controlling all of said engine speed controlling means on all of said units, and polarized connections interconnecting the polarized receptacles on the ends of the units to connect the generator excitation circuits in series and in like polarity irrespective of the end-to-end connection relation of the units whereby upon operation of the controllers on any unit the speed of all the engines may be varied equally and the current in each generator excitation circuit may also be varied equally so that equal variations in excitation current will be supplied to the motor fields connected to the respective generators and therefore equal variations of braking force will be applied to the respective wheels of all of said locomotive units.

RICHARD M. DILWORTH.
STUART H. COWIN.
TORSTEN O. LILLQUIST.